(12) United States Patent
Hendrie

(10) Patent No.: US 6,536,368 B2
(45) Date of Patent: Mar. 25, 2003

(54) TIRE

(76) Inventor: William S. Hendrie, 8 Lakeside Ave., Scarborough (CA), M1N 3C1

( * ) Notice: Subject to any disclaimer, the term of this patent is extended or adjusted under 35 U.S.C. 154(b) by 0 days.

(21) Appl. No.: 10/012,500

(22) Filed: Dec. 12, 2001

(65) Prior Publication Data

US 2002/0050242 A1 May 2, 2002

Related U.S. Application Data

(63) Continuation-in-part of application No. 09/562,637, filed on May 2, 2000.
(60) Provisional application No. 60/257,097, filed on Dec. 22, 2000.

(51) Int. Cl.[7] ............................................... B60C 13/02
(52) U.S. Cl. ..................................... 116/34 A; 152/523
(58) Field of Search .......................... 116/34 R, 34 A; 152/154.2, 523; 73/146.2

(56) References Cited

U.S. PATENT DOCUMENTS

| | | | | |
|---|---|---|---|---|
| 1,687,761 A | 10/1928 | Hahn | ...................... | 116/34 A |
| 1,870,742 A | 8/1932 | Pierce | ...................... | 116/34 A |
| 2,268,312 A | 12/1941 | Stanton | ...................... | 116/34 A |
| 2,800,098 A | 7/1957 | Crosby, Jr. | ................. | 116/34 R |
| 3,362,376 A * | 1/1968 | Norton | ....................... | 116/208 |
| 3,400,745 A | 9/1968 | Schwartz | ............... | 152/209.16 |
| 3,516,467 A | 6/1970 | Sims | ........................ | 152/154.2 |
| 3,621,808 A | 11/1971 | Sidles et al. | ............. | 116/34 R |
| 3,638,704 A | 2/1972 | Boileau | ...................... | 152/523 |
| 4,134,357 A | 1/1979 | Chesley | ..................... | 116/34 A |
| 4,144,921 A | 3/1979 | Yabuta et al. | ............ | 152/154.2 |
| 4,171,676 A | 10/1979 | Kennel | ...................... | 116/34 R |
| 4,318,436 A | 3/1982 | Shurman | .................... | 152/523 |
| 4,760,371 A | 7/1988 | Don | ........................... | 340/449 |
| 4,793,277 A | 12/1988 | Haas et al. | ............... | 116/34 R |
| 4,814,744 A | 3/1989 | Collins | ....................... | 340/443 |
| 4,851,809 A | 7/1989 | McAlister | ................... | 340/442 |
| 4,996,516 A | 2/1991 | Mason | ...................... | 340/443 |
| 5,015,505 A | 5/1991 | Cetnar | ......................... | 427/286 |
| D367,432 S | 2/1996 | Solloway | ..................... | D10/86 |
| 5,522,442 A | 6/1996 | Kishi | .................... | 152/209.23 |
| 6,321,806 B1 | 11/2001 | Sakamoto | .................. | 152/165 |
| 6,418,993 B1 * | 7/2002 | Sakamoto et al. | .......... | 152/539 |

OTHER PUBLICATIONS

U.S. Patent Office Gazette, May 2, 1967, 2 pages.

* cited by examiner

Primary Examiner—Diego Gutierrez
Assistant Examiner—R. Alexander Smith

(57) ABSTRACT

Disclosed herein is a pneumatic vehicle tire comprising a pair of sidewalls and a ground engaging surface extending therebetween, at least one of the sidewalls bearing an outwardly visible inflation-indicating ring and a pair of sighting rings. At least a first portion of the inflation-indicating ring being positioned relative to the ground engaging surface, wherein to the ground engaging surface, wherein when the tire becomes incorrectly under-inflated, the first portion is arranged to change from one position to another visibly distinct position when viewed along a sight line indicated by a pre-determined relationship between the pair of sighting rings.

20 Claims, 7 Drawing Sheets

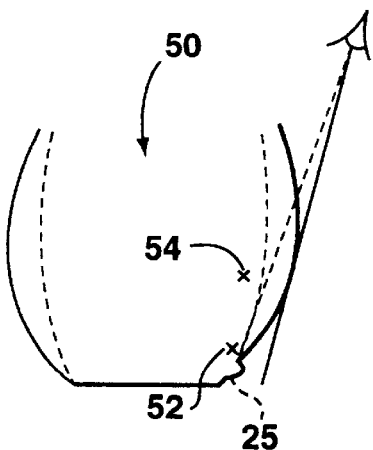
FIG. 9
 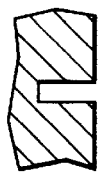 
FIG. 10a    FIG. 10b    FIG. 10c
 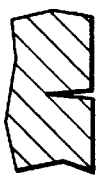
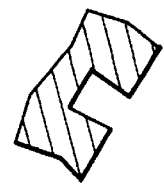 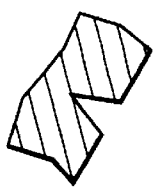
FIG. 10d    FIG. 10e

TIRE

CROSS-REFERENCE TO RELATED APPLICATIONS

This is a continuation-in-part of U.S. patent application Ser. No. 09/562,637 filed May 2, 2000, the contents of which are incorporated herein by reference. This application claims priority from United States provisional Patent application serial No. 60/257,097 filed Dec. 22, 2000

BACKGROUND OF THE INVENTION

1. Field of the Invention

The present invention relates to pneumatic tires.

2. Description of the Related Art

As long as automotive vehicles have had inflatable tires, vehicle operators have had to monitor the pressure of the tires. Over time, there have been a number of methods to do this, including the use of tire gauges and the like. However, the tire gauge often becomes lost, making tire pressure measurement impossible without it. Other techniques rely on the general configuration of the tire to make a guess at whether it is properly inflated. However, this takes a considerable about of skill and is beyond the reach of most amateur vehicle operators.

A number of recent developments have proposed the use of electronic detectors and the like to present an audible or visible signal either in the cab of the vehicle or on the face of the tire to indicate when the tire has become incorrectly inflated. However, these are relatively complicated and will be unsuitable for those vehicles or owners who are disinclined to purchase them.

It is another object of the present invention to provide a novel technique for detecting tire inflation by using the properties of the profile of the tire as the tire changes inflation.

SUMMARY OF THE INVENTION

A pneumatic vehicle tire has a pair of sidewalls and a ground engaging surface extending therebetween, at least one of the sidewalls bearing an outwardly visible inflation-indicating ring and a pair of sighting rings. At least a first portion of the inflation-indicating ring is positioned relative to the ground engaging surface wherein, when the tire becomes incorrectly under-inflated, the first portion changes from one position to another visibly distinct position when viewed along a sight line indicated by a pre-determined relationship between the pair of sighting rings.

Accordingly, the present invention provides a pneumatic vehicle tire comprising a pair of sidewalls and a ground engaging surface extending therebetween, at least one of said sidewalls bearing an outwardly visible inflation indicator ring and a pair of second rings, at least a first portion of said inflation indicator ring being positioned relative to said ground engaging surface such that when the tire becomes incorrectly inflated, said first portion is arranged to change from one position to another visibly distinct position when viewed from a viewing position whereat one ring of said pair of second rings has a pre-determined position relative to another ring of said pair of second rings. For example, the proper sight line may be reached when one of the pair of sight rings is at least partially, or just barely, concealed by, or is immediately beside, the other of the pair of sight rings.

In still another aspect of the present invention, there is provided a technique for monitoring pressure in a tire, comprising: providing a tire with an outwardly visible inflation-indicating ring and a pair of sighting rings on a sidewall arranged such that at least a portion of said inflation-indicating ring changes from one position to another visibly distinct position when viewed from a sight line determined by a pre-determined relative position of said pair of sighting rings when the tire becomes incorrectly inflated.

In another aspect of this invention, there is provided a tire having three ring formations on its sidewall. The first and second ring formations provide a register to guide the viewing of the third outer ring formation. The user may align the first innermost and the second middle rings in order to position his line of sight at the correct elevation and distance from the tire. It is in this position that he can correctly view the third formation in order to determine the condition of the tire.

In one embodiment, the tire has three rings wherein a portion of the outer ring closest to the road becomes concealed when viewed from a position located such that the middle ring closest to the road is just barely concealed by the inner ring when the tire is incorrectly inflated.

In another embodiment, the tire has at least three rings including an outer ring and a pair of central ring formations, wherein a portion of the outer ring closest to the road becomes concealed when viewed from a position located such that the central ring closest to the road is just barely concealed by the inner central ring when the tire is incorrectly inflated.

In one embodiment, the portion of the inflation-indicating ring is concealed when the tire becomes incorrectly under-inflated. In another embodiment, the portion of the inflation-indicating ring is revealed when the tire becomes incorrectly over-inflated.

In another embodiment, the first portion is located on said sidewall and sufficiently close to said ground engaging surface to be concealed by an overlapping portion of the sidewall when the tire is moderately under-inflated.

In another of its aspects, the present invention provides an automobile comprising a plurality of pneumatic tires as defined herein above.

Other features and advantages of the invention will become apparent to one of ordinary skill in the art upon a review of the following drawings in conjunction with the following description of example embodiments of the invention.

BRIEF DESCRIPTION OF THE DRAWINGS

Several preferred embodiments of the present invention will be provided, by way of example only, with reference to the appended drawings, wherein:

FIG. 9 is a schematic end view of a tire;

FIGS. 10a through 10e are successive schematic views of alternative portions of the tire of FIG. 9;

DETAILED DESCRIPTION

Referring to the figures, there is provided a pneumatic vehicle tire 10 having a pair of side walls 12 and a ground engaging (typically tread bearing) surface 14 extending therebetween. Located on at least one of the sidewalls 12 are outwardly visible first and second ring formations shown as lines 18 and 20 in FIG. 1. As will be described, each of the first and second formations respectively has a first portion and a second portion, which has two alternative orientations. Each of these orientations is visually distinct from the other when judged from a distance. In addition, the first and second ring formations each have first and second segments which are positioned relative to the ground engaging surface in order to change from one orientation to another when the tire becomes correctly inflated to a predetermined degree. Preferably, the first and second portions correspond to the first and second segments respectively.

In this particular embodiment, the first portion is operable to change from one orientation to another when the tire becomes moderately incorrectly inflated and the second portion changes from one orientation to another when the tire becomes severely incorrectly inflated, in both cases below the normal (or rated) tire pressure, in other words 'under-inflated' or above the rated tire pressure, that is 'over-inflated'.

The first and second formations may be provided in a number of different forms including a continuous or discontinuous band or a regular pattern, such as a series of regular spaced dashes forming a ring. The formations may be imprinted on the tire, or otherwise applied to the sidewall of the tire. Alternatively, the formations may be integrally formed with the tire. Desirably, the formations may form a circle which is close to the ground engaging surface of the tire, the closer thereto the more pronounced the concealment of the first and second formations will be.

Figure 11:
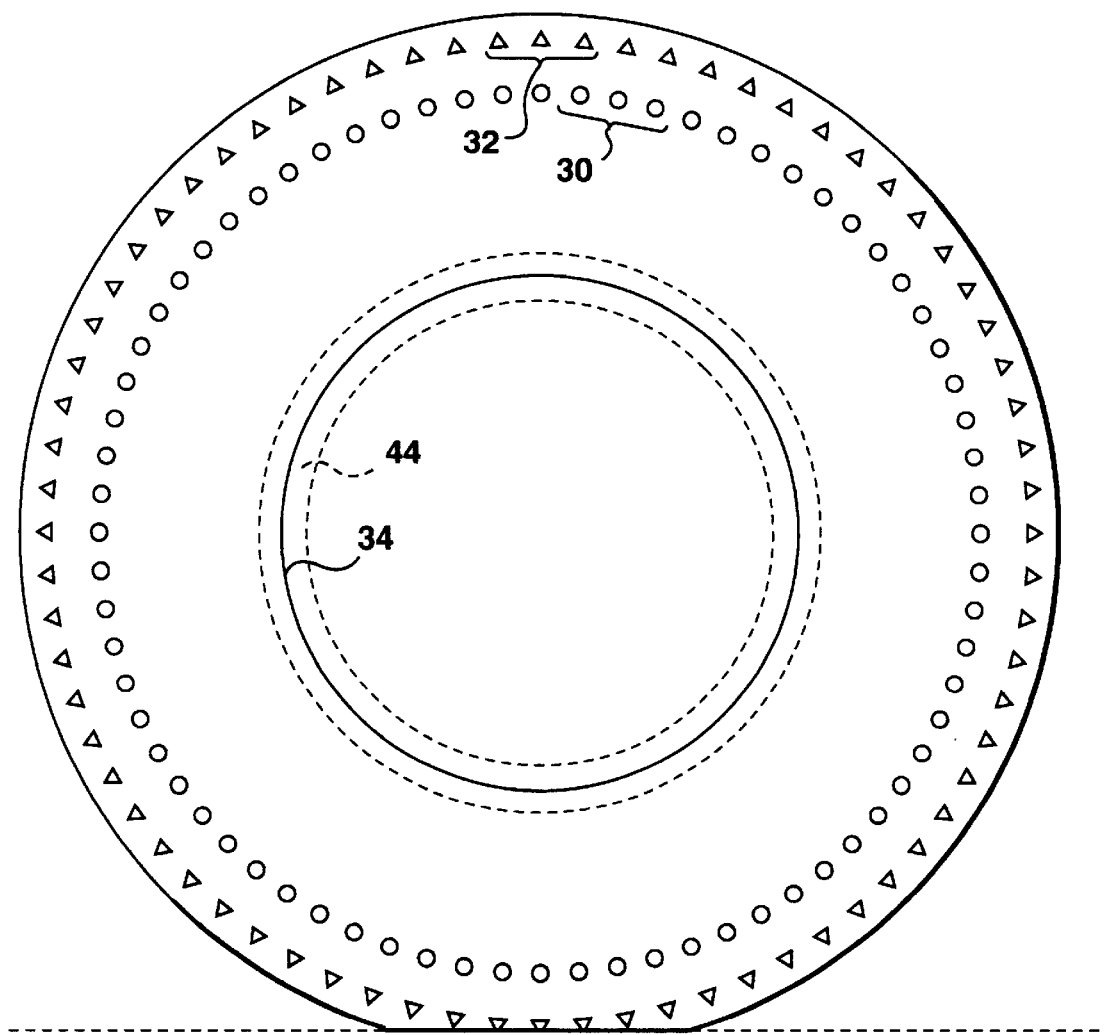
FIGS. 11 and 11a are schematic views of other tires.
Figure 11A:
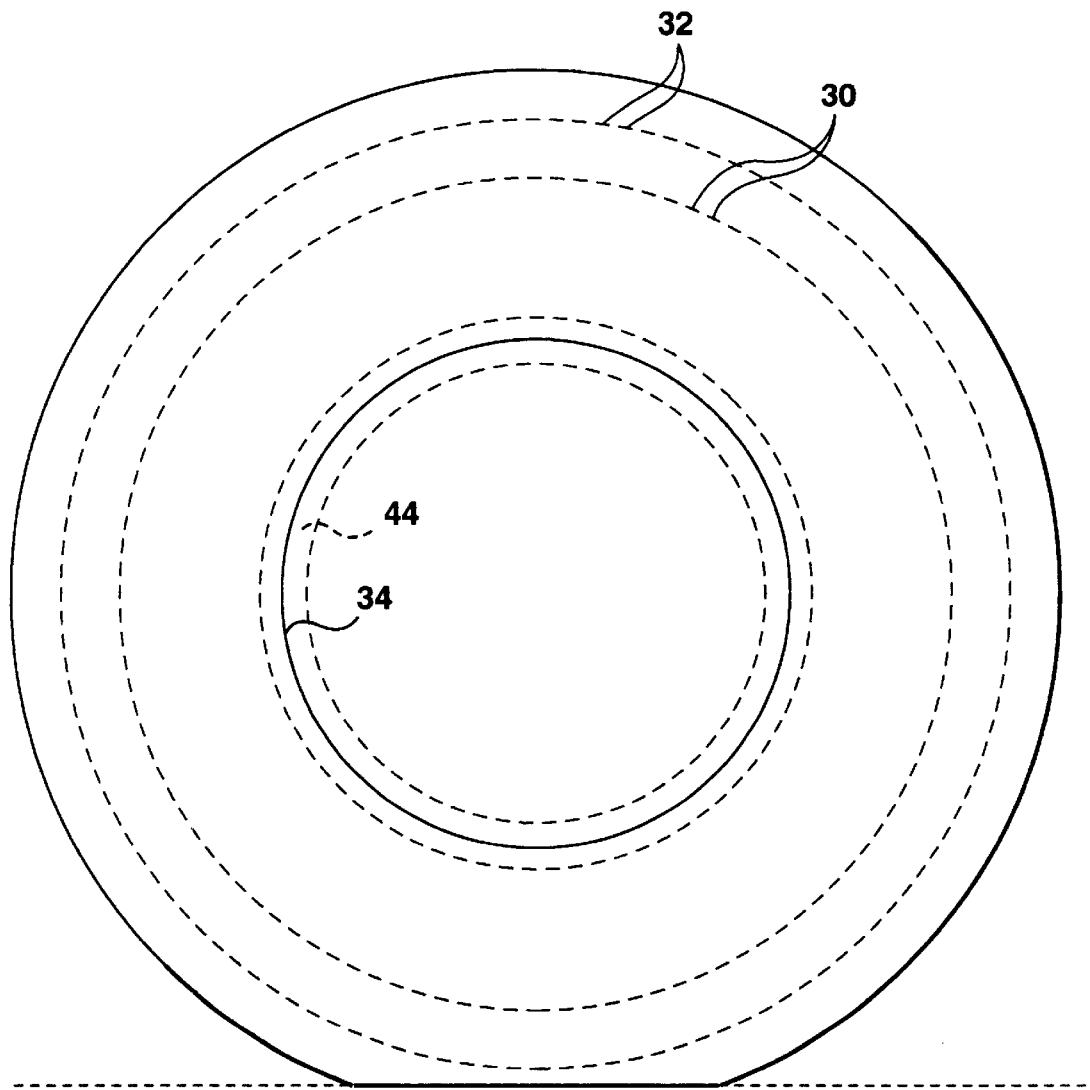

If desired, the formations may have different colours, such as neon or bright hues of, for example, red, yellow, red or green, or alternating bands or segments thereof In this case, the colours may be selected to stand out in the different weather conditions to be faced by the tire, such as rain and snow. These different colours are shown, for example, as an array of circles 30 and triangles 32 in FIG. 11 which are fully exposed to the exterior of the sidewall, while they are shown applied on the inner face of grooves 30 and 32 in FIG. 11a.

Figures 1, 2:
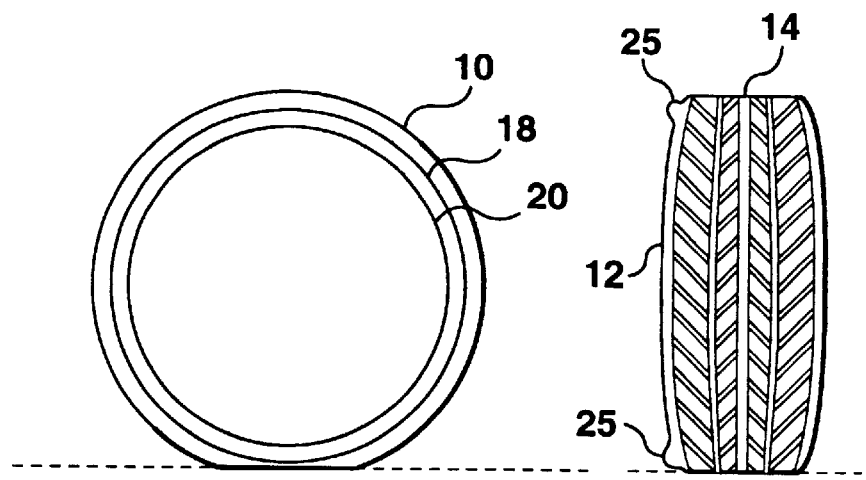
FIG. 1 is a schematic side view of a vehicle tire.
FIG. 2 is an end view of the tire of FIG. 1.

The tire 10 shown in FIG. 1 is also provided with a bead 25, the lower portion of which becomes hidden, at least for many viewing angles, when the tire is under-inflated. Thus the portion of the bead near the road surface can provide an indication of incorrect inflation.

Figure 3:
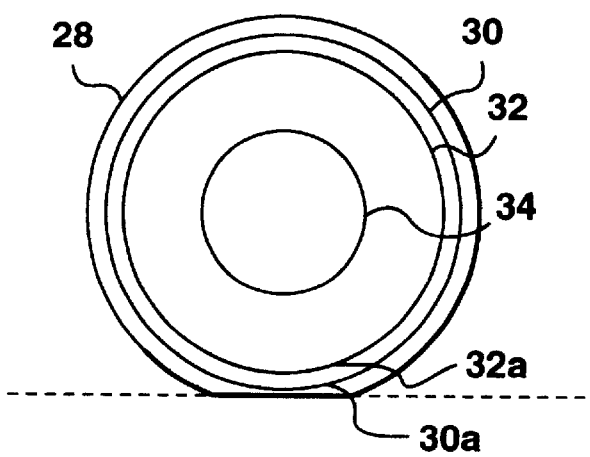
FIG. 3 is a schematic side view of another vehicle tire.

Another tire is shown at 28 in FIG. 3 with a pair of formations 30, 32. In this case, the portion of the formation is normally concealed in one orientation and is revealed in another orientation. In this case, each formation includes a segment 30a, 32a which lies adjacent the ground as the tire rolls thereon under load, the formation being positioned so that a portion of the segment is concealed when the tire is moderately under-inflated (which may be considered to be one operative condition).

Figure 4:
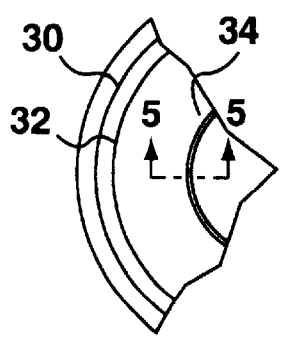
FIG. 4 is a magnified view of a portion of the tire of FIG. 3.
Figure 5:
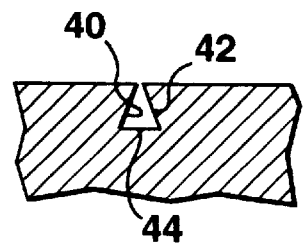
FIG. 5 is a sectional view taken on line 5—5 of FIG. 4.

Referring to FIGS. 4 and 5, the sidewall has a central region that assumes an apex condition when the tire is engaged under load on the ground. In this case, a third formation is provided at 34 which is positioned in the central region and is in the form of a groove which is bordered by two opposing sidewalls 40, 42 with a mouth there between and an inner surface 44. In this case, the sidewalls substantially conceal a portion of the mouth in the vicinity of the ground surface (e.g., the road) when the tire is over-inflated (which may be termed another operative condition) and the sidewalls move relative to one another to widen or open the mouth of the groove in at least one region of the sidewall to reveal the inner surface 44. In this case, one or more portions of the groove may be provided with different colours indicative of the severity of the over-inflation. For example, the inner surface 44 may be one colour and the opposing sidewalls one or two different colours, which may in some cases become visible only when the groove is fully open.

Figure 6:
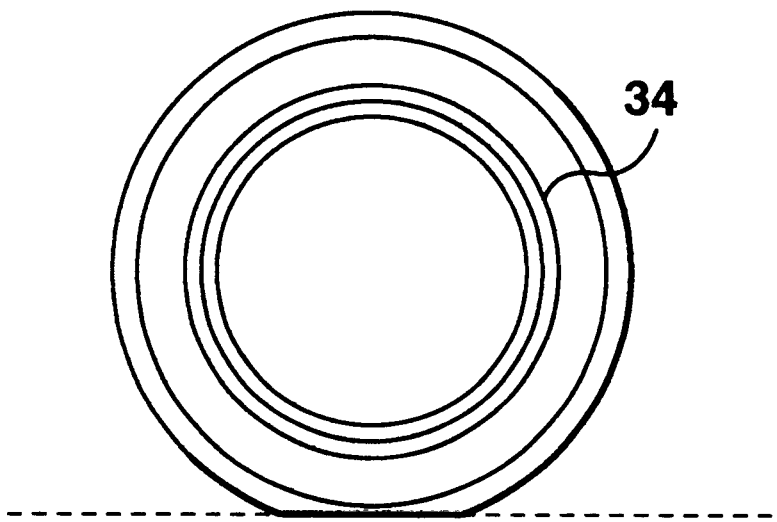
FIG. 6 is a schematic side view of still another tire.
Figure 7:
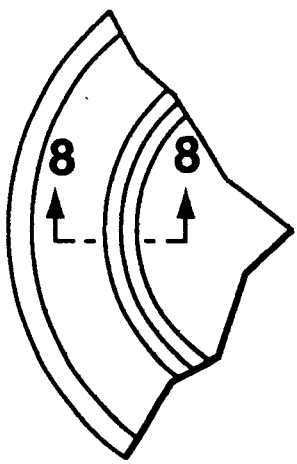
FIG. 7 is a magnified view of a portion of the tire of FIG. 6.
Figure 8:
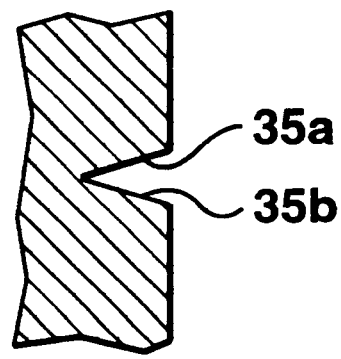
FIG. 8 is a sectional view taken on line 8—8 of FIG. 7.

FIGS. 6, 7 and 8 show yet another tire in which a groove is provided in the sidewall of the tire to be exposed when the tire is incorrectly inflated. In this case, the groove has simply a pair of convergent side faces shown at 35a and 35b.

Referring to FIGS. 9 and 10a to 10e a number of configurations may be employed for the first and second ring formations (or others if need be), it being understood that only one ring formation may be needed to provide effective detection of an incorrectly inflated tire. A tire is shown schematically at 50 in FIG. 9 having two regions 52, 54. The region 52 is below that part of the sidewall of the tire that tends to bulge out when the tire is under-inflated. The region 54 is approximately at the apex of the region of the tire that bulges out when the tire is under-inflated. Thus, for those formations located at 52, they may be dimensioned so that the bulged portion of the tire tends to overlap the formation 52 or alternatively the groove in the formation closes so that the inner surface becomes blocked by one or both of the sidewall of the groove or the bulged portion of the tire, as wound be the would be the case in the examples of FIGS. 10a, 10b and 10c. For those formations located at region 54, the formations may be arranged so that the tire, as it bulges out, causes the sidewalls to separate to reveal the inner surface of the formations which may be otherwise concealed except when the tire bulges to a given degree, as is the case for the example of FIGS. 10d and 10e.

While the above tire has been discussed with respect to automobile applications, it will be understood that the tire may also be adapted for use on other vehicles such as bicycles, trailers, trucks and the like.

In another aspect of this invention, there is provided a tire having three ring formations on its sidewall. The first and second ring formations provide a register to guide the correct viewing of the third outer ring formation. The user may align the first innermost and the second middle rings in order to position his line of sight at the correct elevation and distance from the tire. It is in this position that he can correctly view the third formation in order to determine the condition of the tire.

Figure 12:
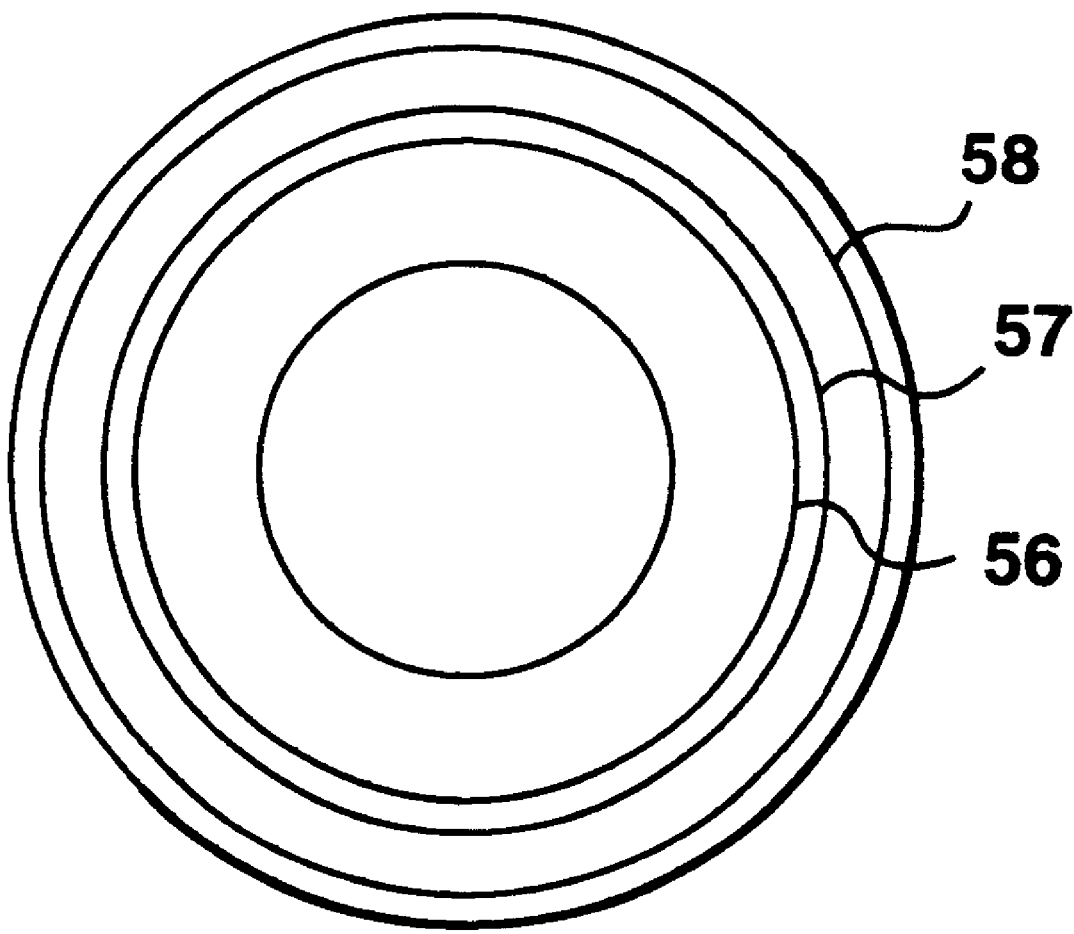
FIG. 12 is a schematic view of yet another tire.

Referring to FIG. 12, a tire is shown having three concentric rings including a first innermost ring 56, a second middle ring 57 and a third ring 58. Each ring may be, for example, of different shape, texture or colour (though the colour is not shown in the figures, but could be, for example, red, green and blue, or any other suitable for example utilizing incrementally, the known colours of the visible spectrum, though not listed here in detail). Each ring may be formed as a bead on the tire, or as a groove, or simply as a band which is flush with the normal profile of the tire. Each ring could also be formed continuously, or as 30 a series of line segments (similarly to what is illustrated for ring formations 30 and 32 in FIG. 11a), or as circular or triangular segments (similarly to what is illustrated for ring formations 30 and 32 in FIG. 11), or in any other suitable fashion. The rings may be integrally formed with the tire, or imprinted or otherwise added afterwards.

Figure 13A:
FIGS. 13a to 13d are schematic operational views of the tire shown in FIG. 12.
Figure 13B:
Figure 13C:
Figure 13D:
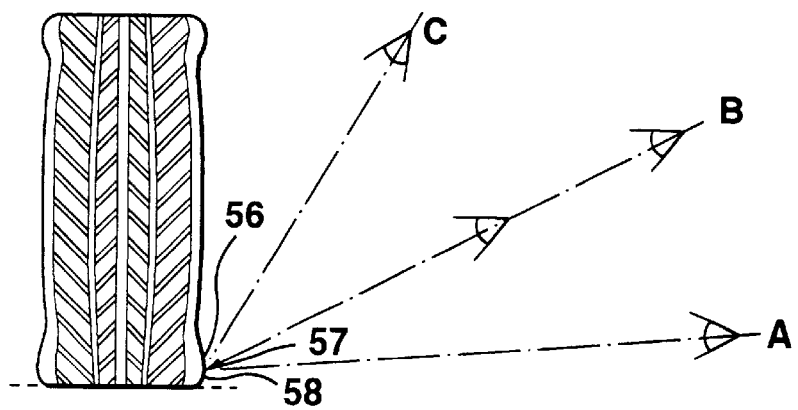

The rings may be arranged so that the inner 56 and middle 57 rings provide a sight line for correctly positioning a user's eye for viewing the outer ring 58. More particularly, the rings may be arranged so that the user has correctly positioned his eyes at the correct elevation and distance from the tire when, in his line of sight, the second middle ring 57 has a pre-determined relationship to the first innermost ring 56. For example, the rings may be arranged so that the user has the proper sight line when the middle ring 57 is almost, or just barely, concealed by the innermost ring 56 at the bottom (ground engaging) portion of the tire. FIGS. 13a through 13c illustrate a progression as the user's eye moves from positions A through C shown in FIG. 13d. Once the user's eye reaches position C, he or she has the proper sight line. Alternatively, the rings may be arranged so that the user has the proper line of sight when the innermost and middle rings are brought into a side by side, or some other, relationship. If, having the proper line of sight, the user can plainly see the outmost ring 58 at the bottom of the tire, then the tire is over-inflated. If ring 58 is just barely visible at the bottom of the tire, the tire is properly inflated, and if ring 58 is not visible, the tire is under-inflated. Thus, with the proper line of sight, the user may correctly assess the condition of the tire as being under-inflated, at a correct pressure, or over-inflated, as the case may be. It will be apparent that, without a proper line of sight, the user might not make a proper assessment of the inflation condition of the tire.

It will be appreciated that the rings may also be arranged differently so that the level-indicating ring is fully visible when the tire is normally inflated, and fully visible and spaced from rings 56 and 57 when the tire is over-inflated. Other arrangements may also be possible.

Thus, the first innermost ring 56 and the second middle ring 57 therefore allow the user to line up his eye to the correct position before judging the inflation level-indicating ring 58.

A short user and a tall user can therefore align their eyes on the correct path drawn upwardly and outwardly from the tire. The taller user should as a result stand slightly farther away from the tire or view the tire in a slightly bent over or squatting position while the shorter user may need to stand slightly closer to the tire.

The second middle ring 57 may, for instance, be just barely concealed behind the first middle ring 56 and then the third ring 58 will be partially (or completely) concealed (as the case may be) from view, at its lowest portion, when the tire is under-inflated.

Other modifications will be apparent to one skilled in the art and, therefore, the invention is disclosed in the claims.

What is claimed is:

1. A pneumatic vehicle tire comprising a pair of sidewalls and a ground engaging surface extending therebetween, at least one of said sidewalls bearing an outwardly visible inflation indicator ring and a pair of second rings, at least a first portion of said inflation indicator ring being positioned relative to said ground engaging surface such that when the tire becomes incorrectly inflated, said first portion is arranged to change from one position to another visibly distinct position when viewed from a viewing position determined by said pair of second rings, wherein one ring of said pair of second rings has a pre-determined position relative to the other ring of said pair of second rings.

2. A tire as defined in claim 1 wherein said viewing position is such that a portion of said one ring is at least partially or just barely concealed by a portion of said other ring.

3. A tire as defined in claim 1 wherein said first portion is concealed when the tire becomes incorrectly under-inflated.

4. A tire as defined in claim 1 wherein said first portion is revealed when the tire becomes incorrectly over-inflated.

5. A tire as defined in claim 1 wherein said first portion lies adjacent the ground as the tire rolls thereon under load, said first portion being arranged to become at least partially concealed when the tire becomes moderately under-inflated.

6. A tire as defined in claim 1 wherein said first portion lies adjacent the ground as the tire rolls thereon under load, said first portion being partially concealed when the tire is normnally inflated and is revealed when said tire is moderately over-inflated.

7. A tire as defined in claim 1 wherein the first portion is located on said sidewall and sufficiently close to said ground engaging surface to be concealed by an overlapping portion of said sidewall when the tire is moderately under-inflated.

8. A tire as defined in claim 1 wherein said inflation-indicating ring is continuous.

9. A tire as defined in claim 1 wherein said inflation-indicating ring is formed of segments having a regular pattern.

10. A tire as defined in claim 1 wherein said inflation-indicating ring is imprinted on said tire.

11. A tire as defined in claim 1 wherein said inflation-indicating ring is applied to the sidewall of said tire.

12. The tire of claim 1 wherein said inflation-indicating ring and said pair of rings are concentric.

13. An automobile comprising a plurality of pneumatic tires as defined in claim 1.

14. The tire of claim 1 wherein the entirety of said inflationn indicator ring is radially closer to a tread of said tire than to a radial innermost portion of said tire.

15. The tire of claim 14 wherein the entirety of at least an outermost ring of said pair of second rings is radially closer to a tread of said tire than to a radial innermost portion of said tire.

16. A tire as defined in claim 1 wherein said in inflation-indicating ring is discontinuous.

17. The tire of claim 1 wherein said inflation-indicating ring and each ring of said pair of second rinks has a different colour.

18. The tire of claim 1 wherein said inflation-indicating ring and each ring of said pair of second rings is a bead.

19. A method for monitoring pressure in a tire, comprising:

providing a tire with an outwardly visible inflation-indicating ring and a pair of sighting rings on a sidewall arranged such that at least a portion of said inflation-indicating ring changes from one position to another visibly distinct position when viewed from a sight line determined by a pre-determined relative position of said pair of sighting rings with respect to each other when the tire becomes incorrectly inflated.

20. A method for assessing the inflation pressure of a vehicle tire of the type having a pair of sidewalls and a ground engaging surface extending therebetween, at least one of said sidewalls bearing an outwardly visible inflation indicator ring and a pair of second rings at least a first portion of said inflation indicator ring being positioned relative to said ground engaging surface such that when the tire becomes incorrectly inflated, said first portion is arranged to change from one position to another visibly distinct position, comprising:

establishing a line of sight by visually positioning said pair of second rings in a pre-determined relationship with respect to each other;

determining whether said tire incorrectly inflated based on an amount of said first portion of said inflation indicator ring which is visible along said line of sight.

* * * * *